June 30, 1936.  W. J. ARMSTRONG  2,045,687
REDUCING MACHINE
Filed March 21, 1931  2 Sheets-Sheet 1

INVENTOR
Walter J. Armstrong.

June 30, 1936.  W. J. ARMSTRONG  2,045,687
REDUCING MACHINE
Filed March 21, 1931  2 Sheets-Sheet 2
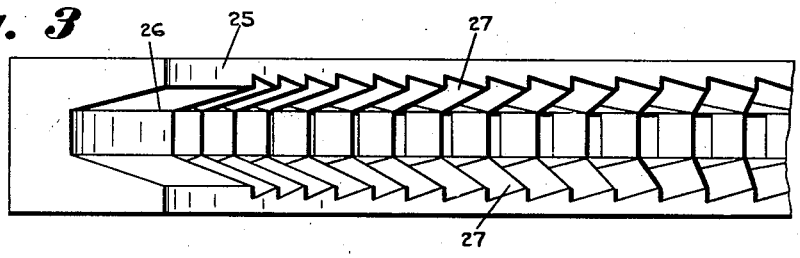
Fig. 3
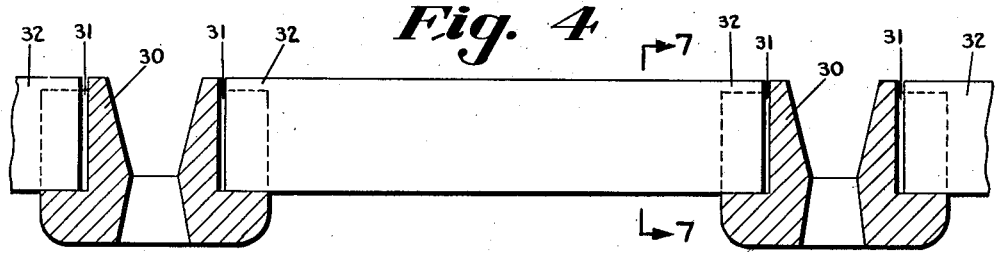
Fig. 4
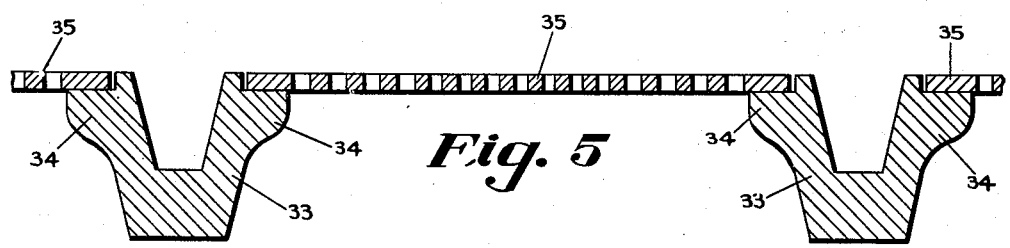
Fig. 5
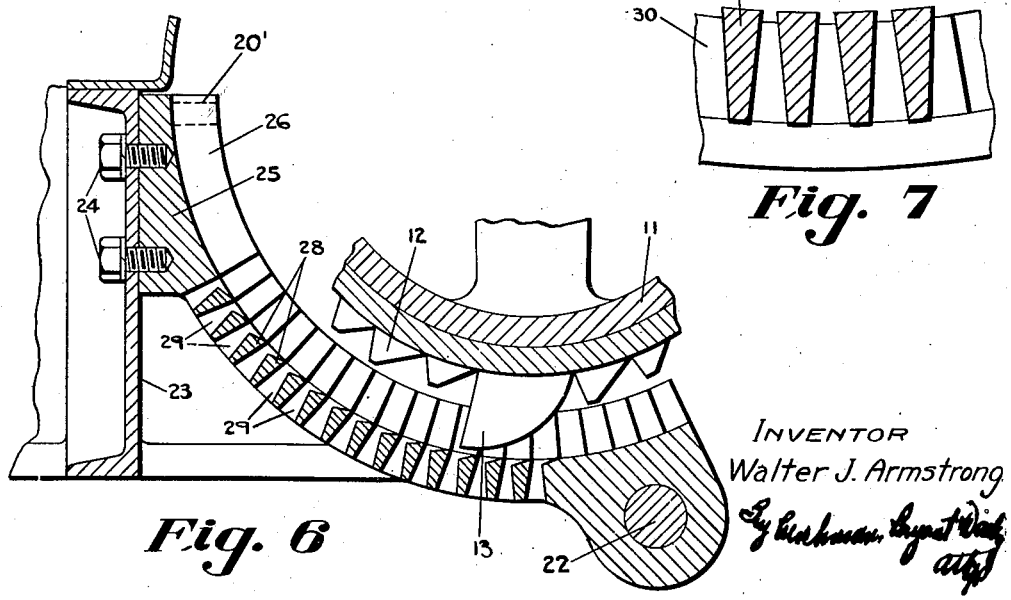
Fig. 6
Fig. 7
INVENTOR
Walter J. Armstrong Patented June 30, 1936

2,045,687

UNITED STATES PATENT OFFICE 2,045,687

REDUCING MACHINE

Walter J. Armstrong, Columbus, Ohio, assignor to The Jeffrey Manufacturing Company, Columbus, Ohio, a corporation of Ohio Application March 21, 1931, Serial No. 524,388

14 Claims. (Cl. 83—53)

The present invention relates to rotary reducing machines and has for its principal object to increase the uniformity of the product of such machines in general, and particularly as regards the relatively fine product.

The invention is readily applicable to machines of the well known type as disclosed in United States Patent 1,045,763, Frank O. Whiting, issued Nov. 26, 1912, and while the invention will be described with particular reference to the machine of this patent, it will be understood that its applicability is not limited thereto.

According to the Whiting machine, a rotor is provided which carries relatively short crushing teeth and relatively long feeding teeth. A concave is positioned relative to the rotor so as to define therewith a feeding throat, the lower end of the concave being in proximity to the rotor and carrying a renewable plate provided with grooves arranged to receive and pass the feeding teeth. The minimum size obtainable with the Whiting machine is limited, if uniformity of the product is to be maintained, since under all conditions, fragments of a certain maximum size are enabled to escape along the grooves in front of the feeding teeth. If this maximum size is the same or smaller than the maximum size desired in the product, the operation of the machine is entirely satisfactory.

If, on the other hand, the maximum size escaping along the grooves is greater than the maximum size desired, the product is unsatisfactory. When, for example, the concave is adjusted toward the rotor to secure a relatively fine product, oversize fragments escape along the grooves and the disparity of such fragments becomes the more marked the finer the product for which the machine is set. By the use of the devices of the present invention, uniformity of the product is assured regardless of whether the machine is adjusted for a coarse or for a very fine product.

According to the present invention, I provide means in continuation of the concave and extending a substantial distance around the rotor in conformation therewith, said means serving to return oversize material to the feeding zone and/or to cooperate with the rotor teeth to effect proper reduction. According to the preferred embodiment of the invention, I provide as such means a number of arcuately shaped bars, one in the rotational path of each of the axially spaced series of feeding teeth, the bars being provided with grooves in continuation of the grooves at the end of the concave or breaker plate. Further, I may provide apertures in the bottoms of the grooves through which material to size may pass from the machine, and the grooves may be provided with inwardly projecting abutment portions in order to insure reduction of material in the grooves. As another feature, particularly where a very fine product is required, screening means such as perforate plates or screen bars may be mounted between the arcuate bars for cooperation with the crushing teeth of the rotor.

In the accompanying drawings, which illustrate a practical embodiment of the invention, Figure 1 is a longitudinal vertical section of a machine with the devices of the present invention applied thereto.

Figure 3 is a plan view of a modified form of arcuate bar.

Figure 4 is a transverse section of a pair of arcuate bars showing screen bars supported therebetween.

Figure 5 is a transverse section of a pair of arcuate bars showing perforated plates supported therebetween.

Figure 6 is a partial section of a machine equipped with the arcuate bar of Figure 3, the section being taken longitudinally of the bar, and Figure 7 is a section on line 7—7 of Figure 4.

Figure 1:
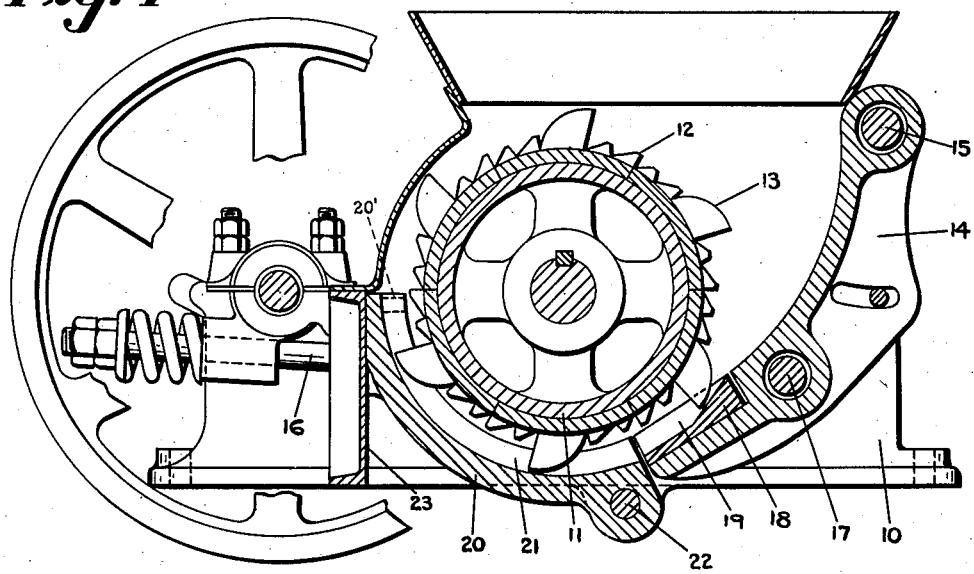
Figure 2:
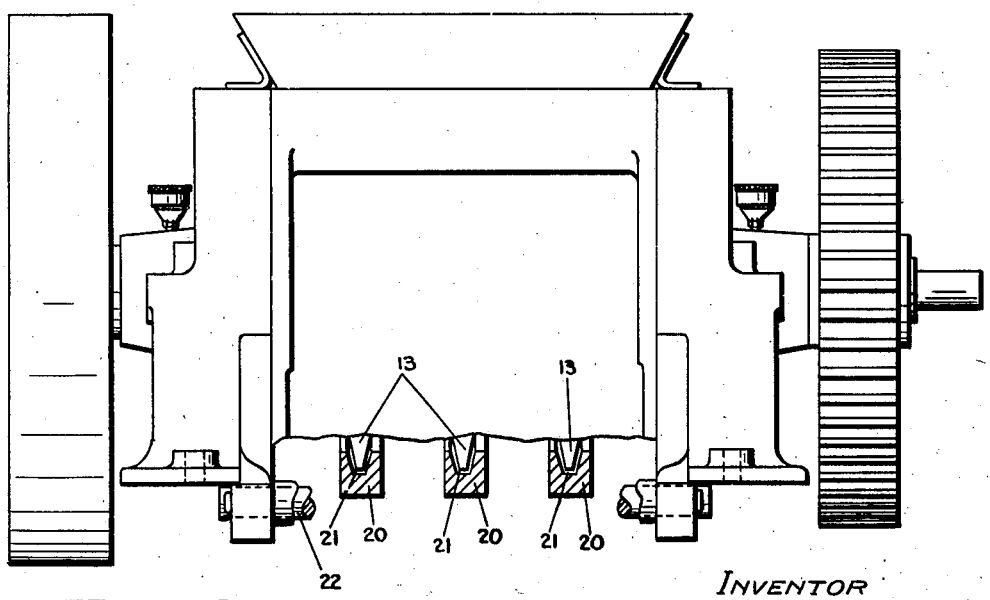
Figure 2 is an elevation of the machine of Figure 1, with parts broken away and other parts in section.

Referring first to Figures 1 and 2, reference numeral 10 designates generally a frame in which is journalled, on a horizontal axis, a rotor 11 provided with relatively short crushing teeth 12 and relatively long feeding teeth 13. A concave 14 is pivotally mounted at its upper end on a rod 15 parallel to the rotor axis, the concave being yieldably positioned relative to the rotor by means of spring influenced rods of which one is shown at 16, Figure 1, these rods respectively engaging the ends of a rod 17 which is engaged in a bore of the concave.

At the lower end of the concave is secured a renewable plate 18 provided with grooves as at 19, one in the path of each of the axially spaced series of feeding teeth 13. As shown in Figure 2, the machine has three such series of feeding teeth.

A bar 20, having a groove 21, is mounted beneath the rotor in alignment with each of the grooves 19, the grooves of these bars forming continuations of the grooves of the breaker plate. The bars are relatively narrow and need be only of such width as to accommodate a groove of sufficient size to pass the feeding teeth, the bars being of arcuate form and the grooves being formed on their inner arcuate faces. At their lower ends, the bars are strong on a rod 22, extending beneath the rotor and supported by the machine frame, while at their upper ends, the bars are bolted to an upright frame element 23, the upper ends of the bars terminating substantially in the horizontal plane of the rotor axis.

In referring to elements 20 as "arcuate bars", reference is had only to their inner or working faces, the exact contours of their outer faces being immaterial so far as the present invention is concerned. Further, the bars may be mounted appropriately in other modes than that shown and their length may be varied to accommodate them to different situations.

It will be evident that oversize fragments entering grooves 19 cannot pass from the machine, but will be carried by the feeding teeth through grooves 21 and returned to the working zone for further reduction. To prevent the fragments from falling back between the upper ends of the bars, I provide filler pieces or plates 20', as indicated in dotted lines in Figure 1, these pieces extending between the top ends of the adjacent bars and secured in any suitable manner.

According to Figures 3 and 6, the latter of which shows cap screws 24 securing the upper end of the bar 25 to the frame element 23, the bar has a groove 26 whose side walls and bottom wall are serrated to provide abutment portions projecting inwardly of the groove. The teeth 27 of the side walls and the teeth 28 of the bottom wall are faced toward the advancing feeding teeth of the rotor, as is clearly shown in Figure 6, the teeth 27 presenting substantially radial abutment edges and the teeth 28 presenting edges extending transversely of the groove. The groove is provided with perforations 29 intermediate the tooth portions 28 to permit the escape of material down to size.

It will be evident that oversize fragments passing from grooves 19 will be apt to be engaged by the abutment portions of the grooves 26 and reduced so as to pass from the machine through apertures 29. Any fragments escaping reduction will be passed back to the working zone as described above with reference to Figures 1 and 2.

In Figures 4 and 7, I have shown bars 30 similar, so far as groove design is concerned, to the bar of Figure 3, but somewhat laterally expanded and provided with lateral recesses 31 adapted to receive and support the ends of screen bars 32, which extend between the adjacent arcuate bars for cooperation with the crushing teeth of the rotor. Screen bars 32 define an additional crushing zone, particularly useful where an exceptionally fine product is required.

In Figure 5, I have shown bars 33 generally similar to those of Figures 1 and 2, but provided with lateral shoulders 34 adapted to support the edges of perforated plates 35, which extend between adjacent arcuate bars. Plates 35 serve the same purpose as the screen bars above described.

It will, of course, be understood that the bar 20 of Figure 1 can be modified to provide supporting recesses for screen bars, as in Figure 4, and that the bar 25 of Figure 3 can be modified to provide supporting ledges for the screen plates, as in Figure 5.

It will be understood that the concave functions in the usual manner, its yieldability under extraordinary stresses being unimpaired since the arcuate bars, as here shown, are preferably mounted entirely independently thereof. These bars are rigidly supported, as here shown, by the machine frame with their top surfaces in substantially flush continuation of the top surface of the breaker plate when the latter is in normal operating position.

While I have shown and described preferred structure, I do not limit myself thereto as various changes may be made without departure from the scope of the invention. Accordingly, I do not limit myself except as in the following claims.

What I claim is:

1. In a machine of the class described, said machine comprising a rotor revoluble on a horizontal axis, a plurality of axially spaced teeth on said rotor, and a concave defining a feeding throat and terminating downwardly beneath the rotor, the combination of means in continuation of the concave and extending upwardly to substantially the horizontal plane of the rotor axis on the opposite side of the rotor from the throat and conformed to the rotor periphery, said means being provided with grooves extending in the circumferential direction of the rotor to receive and pass the rotor teeth, and screening means extending transversely of said first named means between the grooves thereof.

2. In a machine of the class described, said machine comprising a rotor revoluble on a horizontal axis, a plurality of axially spaced teeth on said rotor, and a concave defining a feeding throat and terminating downwardly beneath the rotor, the combination of means in continuation of the concave and extending upwardly to substantially the horizontal plane of the rotor axis on the opposite side of the rotor from the throat and conformed to the rotor periphery, said means being provided with grooves extending in the circumferential direction of the rotor to receive and pass the rotor teeth, and a perforate web disposed between adjacent grooves.

3. In a machine of the class described, said machine comprising a rotor revoluble on a horizontal axis, a plurality of axially spaced teeth on said rotor, and a concave defining a feeding throat and terminating downwardly beneath the rotor, the combination of means in continuation of the concave and extending upwardly to substantially the horizontal plane of the rotor axis on the opposite side of the rotor from the throat and conformed to the rotor periphery, said means being provided with grooves extending in the circumferential direction of the rotor to receive and pass the rotor teeth, and screen bars supported between adjacent grooves.

4. In a machine of the class described, said machine comprising a rotor revoluble on a horizontal axis, a plurality of axially spaced teeth on said rotor, and a concave defining a feeding throat and terminating downwardly beneath the rotor, the combination of arcuate bars supported in continuation of the concave and registering longitudinally with the rotational paths of the teeth, said bars being provided with longitudinal grooves to receive and pass the rotor teeth, and screening means disposed between the bars.

5. In a machine of the class described, said machine comprising a rotor revoluble on a horizontal axis, a plurality of axially spaced teeth on said rotor, and a concave defining a feeding throat and terminating downwardly beneath the rotor, the combination of arcuate bars supported in continuation of the concave and registering longitudinally with the rotational paths of the teeth, said bars being provided with longitudinal grooves to receive and pass the rotor teeth, and screening means disposed between the bars and supported by the latter.

6. In a machine of the class described, said machine comprising a rotor revoluble on a horizontal axis, a plurality of axially spaced teeth on said rotor, and a concave defining a feeding throat and terminating downwardly beneath the rotor, the combination of arcuate bars supported in continuation of the concave and registering longitudinally with the rotational paths of the teeth, said bars being provided with longitudinal grooves to receive and pass the rotor teeth, lateral shoulders on said bars, and screening means between adjacent bars and supported on said shoulders.

7. In a machine of the class described, said machine comprising a rotor revoluble on a horizontal axis, a plurality of axially spaced teeth on said rotor, and a concave defining a feeding throat and terminating downwardly beneath the rotor, the combination of arcuate bars in continuation of the concave and registering longitudinally with the rotational paths of the teeth, said bars being provided with longitudinal grooves to receive and pass the rotor teeth and being provided with lateral recesses, and screen bars extending between adjacent ones of the first named bars with their ends supported in said recesses.

8. In a machine of the class described, said machine comprising a rotor revoluble on a horizontal axis, a plurality of axially spaced teeth on said rotor, and a concave defining a feeding throat and terminating downwardly beneath the rotor, the combination of means supported independently of the concave beneath the rotor and adjacent the rotor periphery in continuation of the concave to receive material from the latter and guide it for further action by the rotor, said means being provided with grooves extending in the circumferential direction of the rotor to receive and pass the rotor teeth, and screening means extending transversely of said named means between the grooves thereof.

9. In a rotary crusher, the combination with a hopper, of a rotary drum rotatably mounted therein and comprising a set of long teeth and a set of short teeth, a yieldable breaker plate having grooves for passage of the long teeth, and a screening device comprising grooves for the long teeth with screen openings in the bottoms thereof and perforated screen plates at the sides of said grooves in association with the short teeth, the construction and arrangement being such that uncrushed material is carried by the long teeth along said grooves in the screening device to the hopper for re-treatment and the crushed material is discharged through the screening device.

10. In a rotary crusher, the combination with a rotor, of two sets of teeth distributed on said rotor one set being relatively short and the other set relatively long, a pivoted yieldable breaker plate having spaced-apart grooves to receive the long teeth, and a fixed screening and pulverizing device having grooves for the long teeth in continuation of the grooves on the breaker plate, said device having screens opposite and adjacent the short teeth, the construction and arrangement being such that the unpulverized material will be carried along said grooves for retreatment and the pulverized material will be discharged through said screens.

11. In a rotary crusher and pulverizer, the combination with a supporting hopper, of a rotary crusher and pulverizer drum having relatively short and relatively long teeth distributed thereon, a yieldable breaker plate having spaced grooves to receive the longer teeth, a fixed pulverizing and screening device comprising spaced grooves for said long teeth with screening means between the grooves and shearing abutments at the sides and bottoms of said grooves of said fixed device.

12. In a single roll crusher, the combination with a supporting frame, of a rotor revoluble on a horizontal axis, a plurality of axially spaced teeth on said rotor, a yieldably mounted breaker plate having formed therein, a plurality of arcuate grooves terminating downwardly beneath the rotor, said grooves receiving and passing said teeth, and means in continuation of said breaker plate and supported independently of the latter adjacent the rotor periphery, said means providing arcuate grooves in continuation of the grooves of the breaker plate and also providing screening openings between its said grooves.

13. Structure according to claim 2 wherein the bottom walls of the grooves are provided with screen openings.

14. Structure according to claim 2 wherein the bottom walls of the grooves are provided with screen openings and wherein the side walls of the grooves are provided with shearing abutments at the openings.

WALTER J. ARMSTRONG.

CERTIFICATE OF CORRECTION.

Patent No. 2,045,687.                                            June 30, 1936.

WALTER J. ARMSTRONG.

It is hereby certified that error appears in the printed specification of the above numbered patent requiring correction as follows: Page 2, first column, line 1, for "strong" read strung; page 3, first column, line 43, before "named" insert the word first; and second column, line 28, claim 11, after "grooves" insert a comma; and that the said Letters Patent should be read with these corrections therein that the same may conform to the record of the case in the Patent Office.

Signed and sealed this 22nd day of September, A. D. 1936.

Henry Van Arsdale (Seal)                                      Acting Commissioner of Patents.